United States Patent [19]
Dierberger

[11] 4,380,906
[45] Apr. 26, 1983

[54] COMBUSTION LINER COOLING SCHEME
[75] Inventor: James A. Dierberger, Hebron, Conn.
[73] Assignee: United Technologies Corporation, Hartford, Conn.
[21] Appl. No.: 227,317
[22] Filed: Jan. 22, 1981
[51] Int. Cl.³ .............................. F02C 7/12; F02C 1/00
[52] U.S. Cl. ................................................ 60/757
[58] Field of Search .................... 60/757, 755, 756; 431/351, 352, 353

[56] References Cited
U.S. PATENT DOCUMENTS 2,973,624 10/1955 Pierce .................................... 60/756
3,793,827 2/1974 Ekstedt ................................ 60/757
3,845,620 11/1974 Kenworthy .......................... 60/757
3,978,662 9/1976 Du Bell et al. ....................... 60/757
4,077,205 3/1978 Pane et al. ............................ 60/757

Primary Examiner—Carlton R. Croyle
Assistant Examiner—Timothy S. Thorpe
Attorney, Agent, or Firm—Norman Friedland

[57] ABSTRACT

A louvered liner construction for a gas turbine engine combustor comprises a film cooling system that includes a double pass cool air film producing means having the cooling air inlet facing compressor discharge air to impinge on a depending lip extending from the hot wall of the louver disposed intermediate to the cooling air inlet and the discharge slot. The cooling air is directed to impinge on the depending wall, change directions in a double loop configuration and heat the stiffening ring prior to discharging into the combustor in a film of uniform cooling air.

5 Claims, 2 Drawing Figures

COMBUSTION LINER COOLING SCHEME

DESCRIPTION

Technical Field

This invention relates to combustors for gas turbine engines and particularly to cooling schemes for louvered constructed combustor liners.

BACKGROUND ART

Because of the hostile environment to which it is subjected, the combustor liner of a gas turbine engine has presented one of the major maintenance problems of the engine. As is well known in this art, many schemes have been employed to cool the liner to increase its durability and lower its propensity to cracking occasioned by the severe thermal stresses.

The current state of the art is particularly exemplified by the apparatus disclosed in U.S. Pat. No. 3,978,662 granted to T. L. DuBell, T. C. Campbell and J. L. Thompson on Sept. 7, 1976 and U.S. Pat. No. 4,077,205 granted to F. C. Pane and D. Sepulveda on Mar. 7, 1978, the latter of which is assigned to United Technologies Corporation, the assignee of this patent application.

Both of these patents essentially show cooling schemes for louver constructed liners where U.S. Pat. No. 3,978,662, supra is a machined louver and U.S. Pat. No. 4,077,205, supra is sheet metal. In each instance the louver carries a lip that extends over the slot that develops or coalesces a film of cooling air which adheres to the wall of the liner for effectuating a cooling barrier for the combustor wall. Obviously, it is advantageous to design the cooling scheme such that the film propagates downstream the maximum distance. Hence, any increase in the expanse of the coalesced film results in a benefit to the durability of the liner.

For example, U.S. Pat. No. 4,077,205, supra installs posts or dimples adjacent the lip to prevent the lip from collapsing completely. The structure of U.S. Pat. No. 3,978,662 is designed to accommodate rearward mounted cooling air inlets for the cooling structure so that the cooling air is turned 180° before being discharged into the combustor. This structure relies on static pressure as opposed to total pressure utilized by the present invention.

One theory that has been expounded for limiting the life of the liner is that the swirling effect of the cooling air persists in the coalesced film. This has the overall effect of impairing a uniform film generated by the louver lip. What seems to develop are localized hot spots adjacent to the swirling flow causing buckling and cracking.

Additionally, it has been found that some schemes expose certail wall surfaces of the liner at susceptible problem areas to both the hottest and coldest conditions. The high temperature difference obviously carries high thermal stresses working to the disadvantage of the liner.

I have found that by my invention, I can obviate or at least lessen the deleterious effects of the problems noted above. By virtue of the double loop cooling airflow, the swirling component is substantially reduced or eliminated effectuating a more uniformed coalesced cooling film that tests have shown to propagate further downstream than heretofore known cooling schemes, including the schemes shown in the aforementioned patents. Additionally, this scheme allows the air to pick up a given heat content that is in turn conducted to the stiffening ring that is exposed to the cold air side of the combustor. This heats the stiffening ring to a temperature intermediate to the cold air temperature and the hot combustor temperature resulting in a lower $\Delta T$ and obviously, lessening the thermal stresses.

DISCLOSURE OF INVENTION

An object of this invention is to provide for a gas turbine louver combustor improved cooling means.

A feature of this invention is to provide for the louver constructed combustor liner a double pass loop cooling scheme adjacent to the discharge lip that coalesces the cooling air in a film for adhering against the inner combustor wall a maximum distance from the discharge lip. The inlet openings to the double pass loop face the compressor discharge gases leaving the engine compressor and flowing in a downstream direction in relation to the flow of gases discharging from the compressor.

Other features and advantages will be apparent from the specification and claims and from the accompanying drawings which illustrate an embodiment of the invention.

BEST MODE FOR CARRYING OUT THE INVENTION

While this invention is shown in its preferred embodiment being incorporated into the liner of an annular burner for a gas turbine engine, it should be understood that the invention has application for other types of louver liners as say for the can type. For a better understanding of gas turbine engine combustors, reference should be made to the aforementioned patents and the combustors for the JT-8D and JT-9D engine models manufactured by Pratt & Whitney Aircraft Group, division of United Technologies Corporation, the assignee of this patent application.

Figure 1:
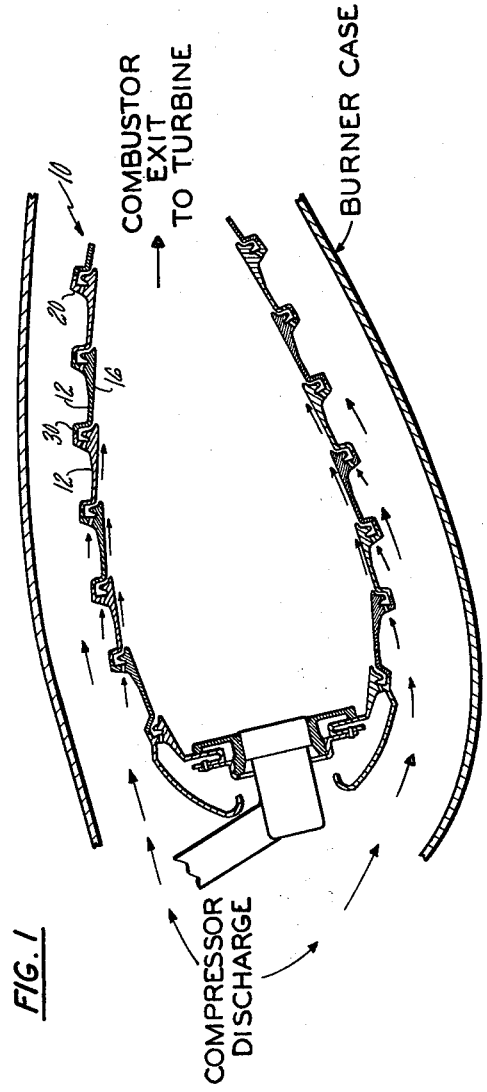
FIG. 1 is a partial view partly in cross section and partly in elevation showing the combustor incorporating this invention.
Figure 2:
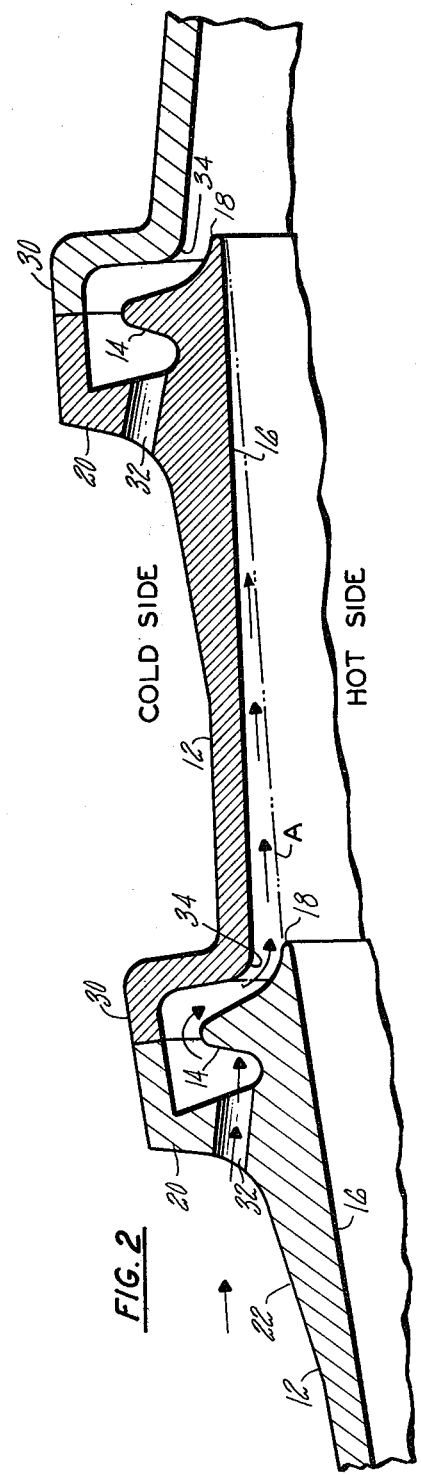
FIG. 2 is an enlarged partial view in section showing the details of this invention.

Referring to FIGS. 1 and 2, the annular burner generally indicated by reference numeral 10 is suitably supported in a gas turbine engine for housing the heat generating mechanism of the engine. As is well known combustion of the fuel ensues therein for developing sufficient energy to drive the turbine and develop horsepower or thrust depending on whether it is a turboprop engine or a jet engine.

The burner comprises a plurality of louvers constructed cylindrical or conical members 12 mounted end to end in a lengthwise manner defining a hollow combustion chamber. The end of each louver carries a lip-like portion that serves to generate a cooling film for cooling the adjacent wall of the liner.

The cooling scheme of this invention is best illustrated by referring to FIG. 2 which is an enlarged portion of a typical louver.

As can be seen from FIG. 2, the fin 14 depends from the hot wall portion 16 of louver member 12 and is disposed between lip 18 and the inlet flange 20. As noted, the lip 18, the fin 14 and flange 20 are circular in shape and may be fabricated by being machined or rolled. Fin 14 serves a dual function (1) of supporting the lip eliminates the need for supporting posts as required in some prior art combustors and (2) turning the air. Further, the end may be fabricated as a unitary louvered member or the cooling members may be fabricated separately and welded to the remaining louver portion. In its preferred embodiment, it is desirable to roll or cast the entire louver section and fabricate it into the combustor configuration.

A section 30 of the louver 12 is bent to form a closure of the film cooling section and confines the cooling airflow so that compressor discharge air is admitted internally thereof through a plurality of inlet openings 32 which is dimensioned and located to effectively impinge on the fore face of fin 14. In this configuration inlets 32 see the total pressure of compressor discharge pressure. The internal configuration causes the air to turn and flow around the fin washing the underside of the bent portion 30. This portion may be used as a stiffener so as to aid in preventing the structure from buckling.

As is apparent from the foregoing, the washing of the bent portion 30 conducts heat thereto and reduces the thermal difference across the metal of bent portion 30, which is exposed to cooling air at its outer surface and the heat from the combustor on the inner surface.

Lip 18 and the elbow 34 formed on the rear end of louver section 12 form an annular slot for the air passing over the fin in a double loop fashion to coalesce and discharge into the combustor in a film. This cooling air film is directed to adhere to the inner wall surface of louver 12 to shield the metal from the intense heat of the combustor and propagates downstream as far as possible as illustrated by the dashed line A. As noted, the portion 22 is tapered in cross section and serves to aid in increasing conduction into the supporting fin 20.

By virtue of this cooling scheme the incoming swirling air discharges in a film substantially void of any swirls and vortices which have shown to enhance the durability of the liner and produce a more uniform temperature gradient in the associated metal. Also, the vortices created by the interaction of the air issuing from the plurality of inlets 32 and the impingement of the fin 18 are eliminated or substantially so by the double loop flow path. Another benefit gained from the double loop flow path is that this design allows the use of a reasonably short lip without diminishing the residence time of the cool air in the film generating mechanism. The additional heating of the stiffening section 30 serves to reduce the thermal differential that this structure sees and hence reduces the thermal stresses thereof.

It should be understood that the invention is not limited to the particular embodiments shown and described herein, but that various changes and modifications may be made without departing from the spirit and scope of this novel concept as defined by the following claims.

I claim:

1. For a combustor having a louvered liner formed by a plurality of louvers defining a combustion zone, the outer face of said liner exposed to cooler air and the inner face of said liner exposed to hot gases of combustion, said cooler air flowing from an upstream to a downstream direction relative to the flow of the hot gases in the combustion process, a radially outward extending annular flange on one end of one of said louvers of said liner spaced from an end of one of said louvers, the next adjacent louver having an over-lying end abutting said flange and defining therewith an outer annular cavity surrounding said end of said louver, a radially outward extending fin on said one end of said louver spaced intermediate the end of said louver and said flange and spaced from said over-lying end defining a pair of annular subchambers, the end of said louver adjacent said fin having a lip and the next adjacent louver being spaced from said lip to define an annular slot communicating with said subchambers, an inlet opening facing the flow of cooler air for admitting cooler air into said annular chamber to impinge on said fin, change direction and flow from one of said subchambers to the other of said subchambers and through said slot into said combustion zone whereby the cooling air in said subchambers coalesce into a film and discharge as a film through said slot to adhere adjacent the inner face of said liner as it flows downstream in said combustion zone.

2. For a combustor as in claim 1, wherein said inlet opening comprises a plurality of circumferentially spaced drilled holes in said flange.

3. For a combustor as in claim 2 wherein the louver portion immediately upstream of said flange tapers to an increasing thickness in cross section from the upstream to the downstream direction.

4. For a combustor as in claim 2 wherein the axis of said drilled holes is angularly disposed relative to the center line of said lining and disposed so that the cooling air impinges at the base of said fin.

5. In a turbine type power plant having a compressor and burner, said burner having a generally elongated coannular shaped louver liner defining a combustion zone, said louver liner having a plurality of louver sections, each louver section having an upstream end and a downstream end relative to the flow of combustion gases, the upstream end having a radially outward extending flange and the downstream end having a radially outward extending overlapping portion defining an annular chamber surrounding the upstream end of the adjacent louver section, a fin extending from the upstream end short of said radially outward extending overlapping portion defining a pair of subchambers, a circumferential lip formed on said upstream end of said louver section and spaced from the downstream end of said adjacent louver section defining an annular slot, a plurality of circumferentially spaced inlet openings in said flange facing the flow of air discharging from said compressor for directing said air onto said fin for cooling said fin and being turned to impinge on said overlapping portion for heating the same and again turning said air where it flows through said annular slot as a film for shielding the adjacent louver section.

* * * * *